(12) United States Patent
Baronoff et al.

(10) Patent No.: US 10,492,468 B2
(45) Date of Patent: Dec. 3, 2019

(54) STRETCHABLE ANIMAL FOOT COVERING

(71) Applicant: LX2 Creative, LLC, New York, NY (US)

(72) Inventors: Lisa Baronoff, New York, NY (US); Lori Moss, New York, NY (US)

(73) Assignee: LX2 CREATIVE, LLC, New York, NY (US)

( * ) Notice: Subject to any disclaimer, the term of this patent is extended or adjusted under 35 U.S.C. 154(b) by 174 days.

(21) Appl. No.: 15/379,910

(22) Filed: Dec. 15, 2016

(65) Prior Publication Data

US 2017/0156293 A1    Jun. 8, 2017

Related U.S. Application Data

(63) Continuation of application No. 29/547,425, filed on Dec. 3, 2015, now Pat. No. Des. 797,384.

(60) Provisional application No. 62/268,251, filed on Dec. 16, 2015.

(51) Int. Cl.
*A01K 13/00*    (2006.01)

(52) U.S. Cl.
CPC .................. *A01K 13/007* (2013.01)

(58) Field of Classification Search
CPC ......... A01K 13/007; A01K 13/00; A61D 9/00
See application file for complete search history.

(56) References Cited

U.S. PATENT DOCUMENTS

| | | | |
|---|---|---|---|
| 3,747,565 A | 7/1973 | Kellam | |
| 4,633,817 A | 1/1987 | Taylor | |
| 5,341,765 A * | 8/1994 | McComb | A01K 13/007 119/850 |
| 5,676,095 A | 10/1997 | Ralls | |
| 7,802,542 B1 * | 9/2010 | Zimmerman | A01K 13/007 119/850 |
| D678,629 S | 3/2013 | Powell | |
| 8,393,303 B1 * | 3/2013 | Krysak | A01K 13/007 119/714 |
| 8,677,944 B2 | 3/2014 | Kissel, Jr. | |
| 2008/0173258 A1 | 7/2008 | Franco | |
| 2011/0017151 A1 | 1/2011 | Simoni | |
| 2011/0209673 A1 * | 9/2011 | Weyerman | A01K 13/007 119/856 |
| 2014/0250732 A1 * | 9/2014 | Hammond | A01K 13/007 36/111 |
| 2016/0044895 A1 * | 2/2016 | Schnieder | A01K 13/006 119/850 |
| 2017/0086424 A1 * | 3/2017 | Blanchet | A01K 13/007 |

FOREIGN PATENT DOCUMENTS

| | | | |
|---|---|---|---|
| JP | 4153554 B1 | | 9/2008 |
| JP | 2012135243 A | * | 7/2012 |

OTHER PUBLICATIONS

Dermapaw, "how to make your own stay put dog socks at home", uploaded Oct. 6, 2009, URL: <https://www.youtube.com/watch?v=E7TTjm4gNIU>.

* cited by examiner

*Primary Examiner* — Son T Nguyen
(74) *Attorney, Agent, or Firm* — Myers Wolin, LLC

(57) ABSTRACT

A stretchable animal foot covering comprising an elongated body with a foot-receiving chamber on opposite ends of the elongated body that is formed from stretchable material that is at least partially closed at the ends to form the foot-receiving chambers.

14 Claims, 15 Drawing Sheets

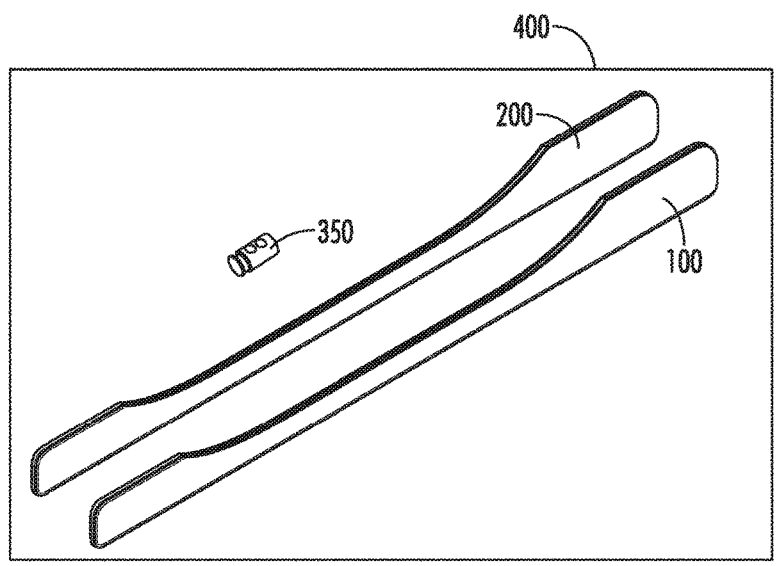
*FIG. 19*
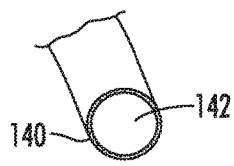  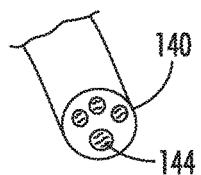  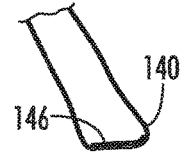
*FIG. 20*  *FIG. 21*  *FIG. 22*

US 10,492,468 B2

STRETCHABLE ANIMAL FOOT COVERING

CROSS-REFERENCE TO RELATED APPLICATIONS

This application claims the benefit of U.S. Application 62/268,251, filed Dec. 16, 2015, the contents of which are incorporated herein by reference. This application is also a continuation-in-part of U.S. application Ser. No. 29/547,425, filed Dec. 3, 2015, the contents of which are incorporated herein by reference.

FIELD OF THE INVENTION

The present invention relates generally to foot protection for animals, and more particularly to a stretchable animal foot covering that is easy to put on an animal and allows for increased mobility during use.

BACKGROUND

It can be challenging to keep an animal clean while living in an urban environment. A dog can become very dirty after a single walk, and even more so in the event of rain, snow or the like. The same applies to other wet and/or dirty environments outside of a city.

Applying foot protection to animals can be challenging. Standalone boots are often not well received by animals. Many don't know how to walk in boots, or the boots come loose, or they are too tight and are uncomfortable to the animal. Size may also be an issue, since animal boots are typically attached by an elastic band with varying success.

There is a need for foot protection for animals that is easy to apply, that will stay on the most active animal, that is not unduly restrictive or limiting in movement and that can be easily removed and cleaned.

SUMMARY

A stretchable animal foot covering is provided that, in one embodiment, comprises an elongated body with a foot-receiving chamber on opposite ends of the elongated body that is formed from a stretchable material that terminates in at least partially closed at the ends to form the foot-receiving chambers, but that is open along at least a portion of the elongated body so that, in one embodiment, the elongated body portion can lay across an animal's back when the foot covering is worn by an animal. In one embodiment, there is also provided at least one fastener for adjusting the size of the elongated bodies. In one embodiment, the foot-receiving chambers are formed from the same material as the elongated body. In one embodiment, the foot-receiving chambers are formed from different material than the elongated body, and preferably material that is suitable to protect the animal's feet in adverse weather conditions.

BRIEF DESCRIPTION OF THE DRAWINGS

FIG. 19 illustrates one embodiment of a kit comprising one embodiment of a pair of coverings and one embodiment of an adjustable fastener.

FIG. 20 illustrates one embodiment of a grip provided on a portion of a covering.

FIG. 21 illustrates one embodiment of a grip provided on a portion of a covering.

FIG. 22 illustrates one embodiment of an insert provided inside a portion of a covering.

DETAILED DESCRIPTION OF THE PREFERRED EMBODIMENTS

Figure 1:
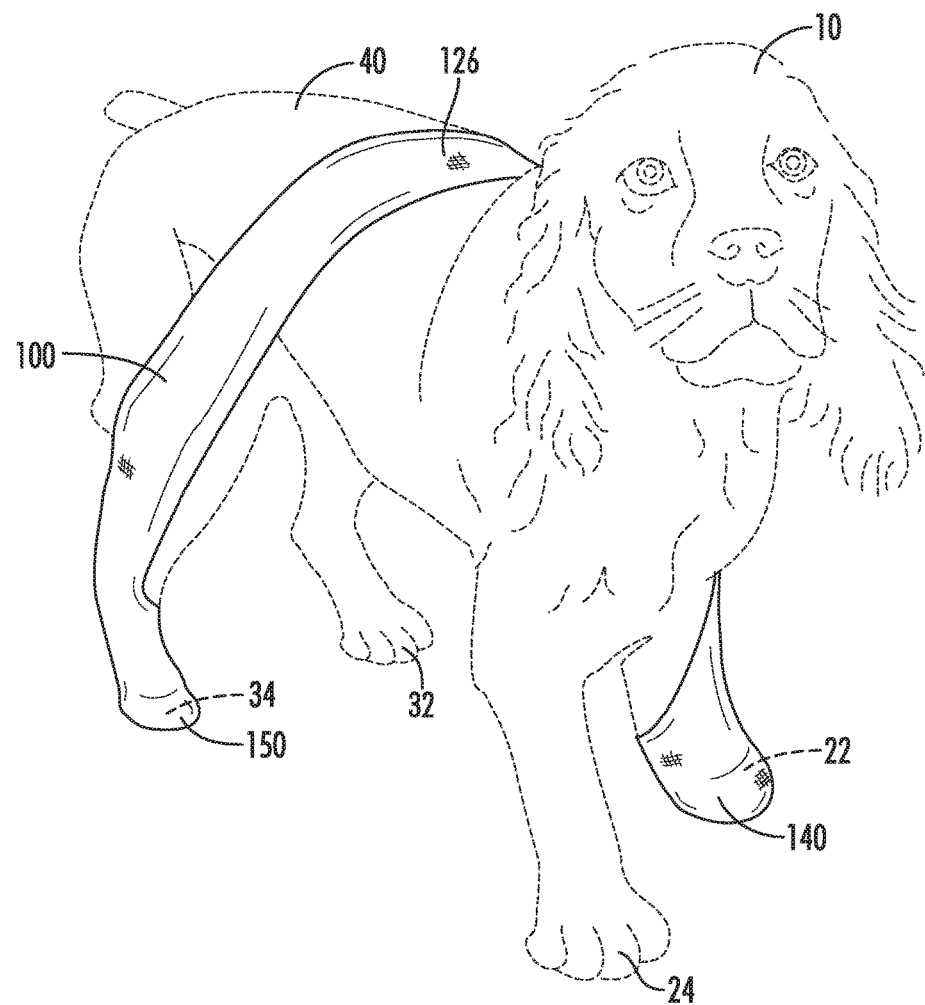
FIG. 1 illustrates one embodiment of a stretchable animal foot covering shown being worn by an animal.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

FIG. 1 illustrates one embodiment of a stretchable animal foot covering 100 being worn on an animal 10 having a plurality of front paws or feet 22 and 24 (collectively front feet 20) and a plurality of back paws or feet back feet 32 and 34 (collectively back feet 30). For purposes of explanation and convenience, all of the animal paws illustrated and discussed herein will be deemed "feet," it being understood that an animal foot can be termed differently depending on the animal (i.e. a hoof on a horse, for example). Further, while a certain type of animal (i.e. dog) is illustrated and described herein, it will be appreciated that the animal foot covering 100 of the present disclosure may be used on other types of animals without departing from the scope of the disclosure. The covering 100 is preferably formed from a stretchable fabric, such as nylon, spandex, Lycra®, or other synthetic fiber, or a combination thereof, that allows the animal to move freely without feeling constrained or without its movement being unduly hindered. Other material constructions are contemplated.

Figure 2:
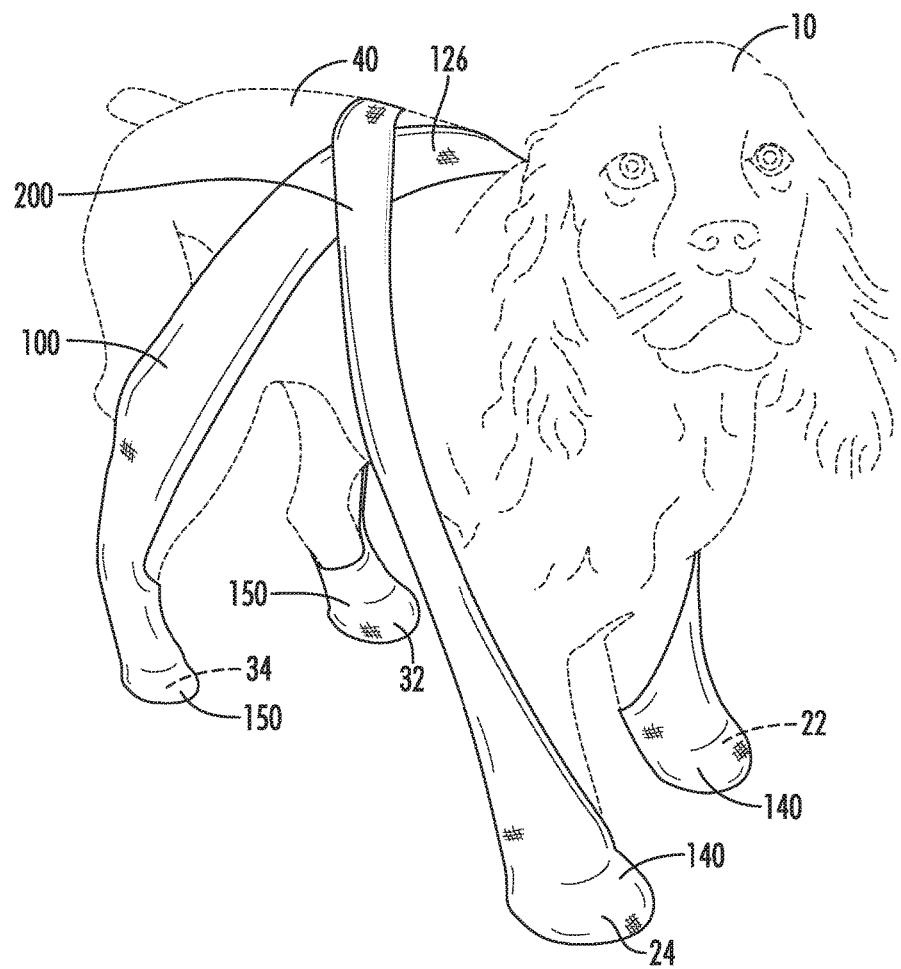
FIG. 2 illustrates one embodiment of a plurality of stretchable animal foot coverings shown being worn by an animal.
Figure 3:
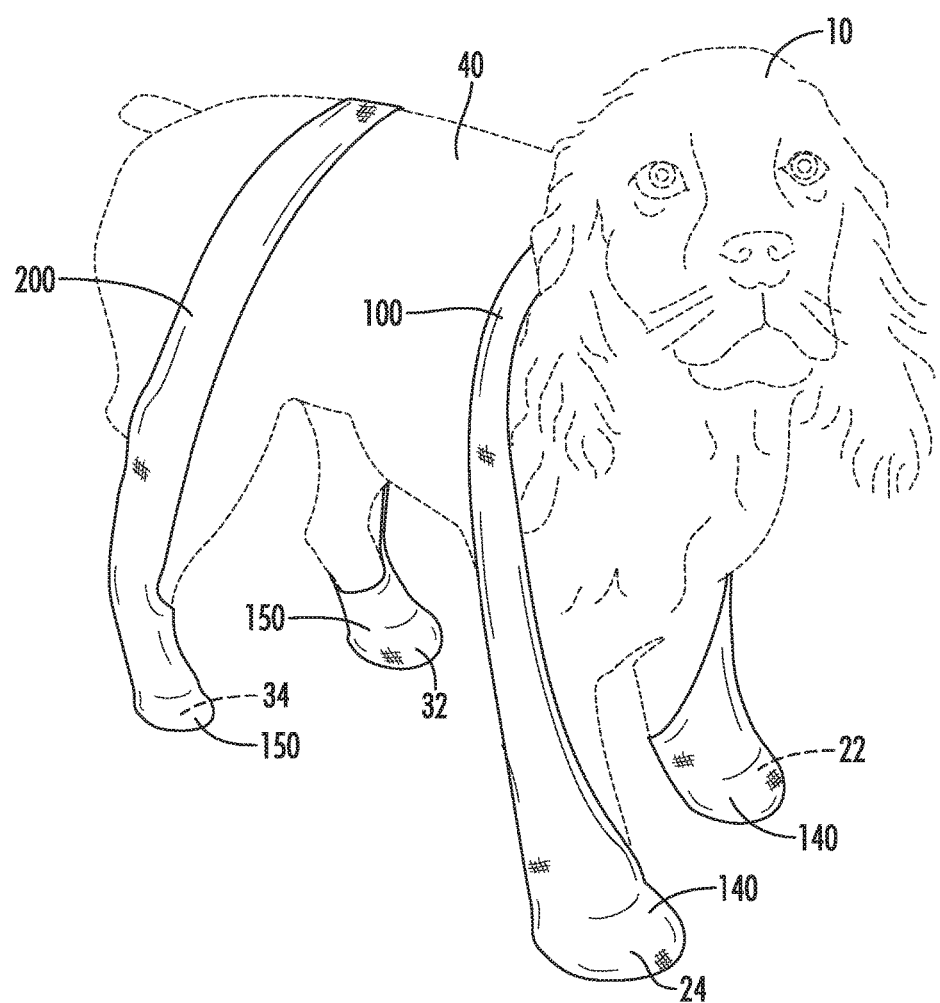
FIG. 3 illustrates one embodiment of a plurality of stretchable animal foot coverings shown being worn by an animal.

In the embodiment of FIG. 1, covering 100 extends across a back 40 of the animal 10 from front foot 22 to rear foot 34. In a further embodiment of FIG. 2, an additional covering 200 extends over the first covering 100 across the back 40 of the animal 10 from the front foot 24 to the rear foot 32. In yet a further embodiment of FIG. 3, coverings 100 and 200 do not cross over the animal's back 40 as shown in FIG. 2 for example, but instead the first covering 100 extends from front foot 22 to front foot 24, while the second covering 200 extends from the rear foot 32 to the rear foot 34. While FIGS. 1-3 illustrate certain embodiments of wearing the coverings 100 and 200, it will be appreciated that other combinations of embodiments and methods of wearing the coverings are contemplated. For example, in one embodiment (not shown), a single covering formed from a single piece construction, rather than two separate coverings, may be arranged to attach to all feet of an animal so that a single piece of material may be extend across the back of an animal in an "x" formation, for example, and be formed with four foot-receiving chambers (as defined herein) connected to a central hub of material. Other variations are possible.

The stretchable animal foot covering 100, 200 illustrated in FIGS. 1-3 is intended to protect an animal's feet from its environment without unduly hindering its movement so that it does not feel constrained by wearing the coverings 100, 200. In one embodiment, it might be desired to cover the animal's feet from a muddy trail, or wet pavement or grass, or snow or ice, or hot pavement, or a multitude of other environments, wherein the material used to form the covering would be suitable to protect the animal in such environments. The type of environment may determine the type of covering used and the material composition of the covering. For example, in the summer, it may be desired to use a covering formed from a lighter weight material, to help ventilate the animal's feet. In the winter, it may be desired to use a covering formed from a heavier or warmer material to protect the animal's feet from the elements. For rainy days, the covering may be waterproof to prevent the animal's feet from getting wet. Thus, a user may have a variety of different coverings to accommodate different environmental conditions.

Figure 4:
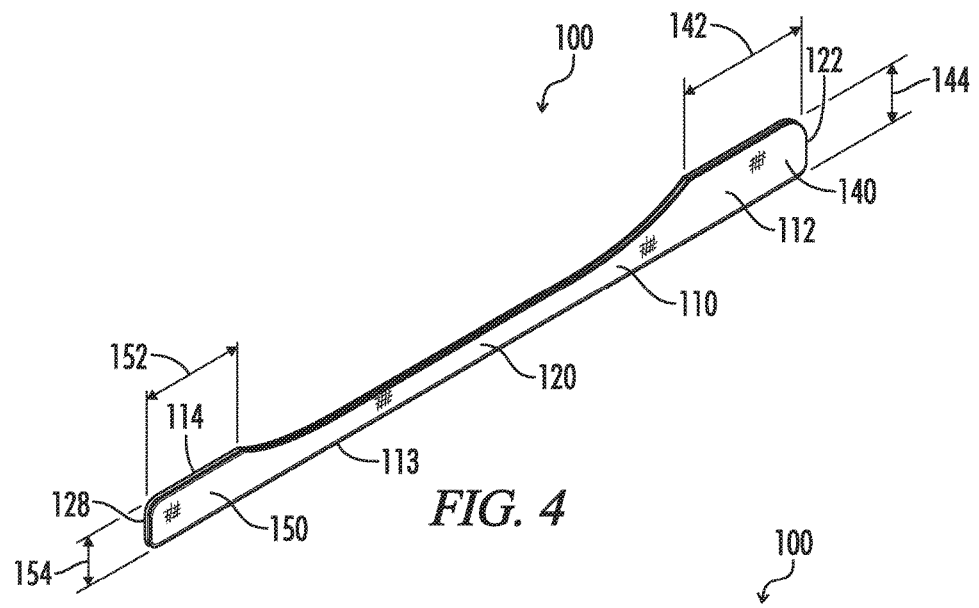
FIG. 4 is a perspective view of one embodiment of a stretchable animal foot covering in a closed condition.
Figure 5:
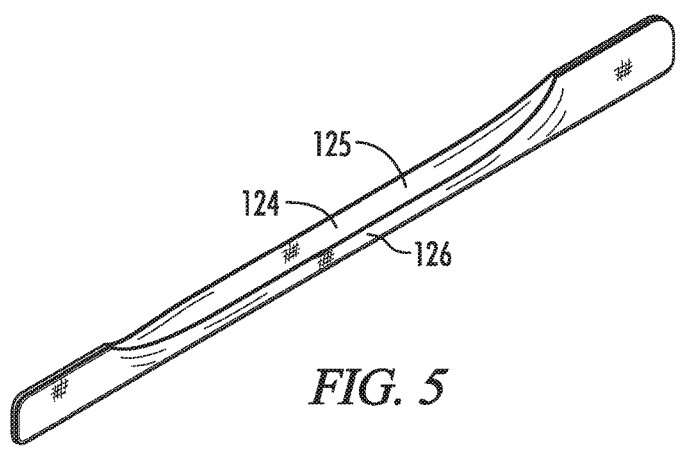
FIG. 5 is a perspective view thereof in a slightly opened condition.

FIG. 4 illustrates a perspective view of covering 100 in a closed condition, while FIG. 5 illustrates the covering of FIG. 4 in a partially open condition and ready to receive an animal's feet. For purposes of explanation, FIGS. 4-5 will be used to describe covering 100, it being understood that such explanation can also apply to covering 200. Covering 100 further comprises an elongated body 120 having a foot-receiving chamber 140 on one end 122 of the elongated body 110 and a foot-receiving chamber 150 on an opposite end 128 of the elongated body 120. Covering 100 is preferably formed from a single piece of stretchable material 110 having a first side 112 and a second side 114 that is folded along an axis 113 and that is at least partially closed at the ends 122, 128, by sewing or the like, to form the foot-receiving chambers 140, 150. More specifically, the foot-receiving chambers 140, 150 are sewn together in the area of the ends 122, 128 and extending along the body 120 to form pockets that are shaped like an inverted "L" shape, such as like a partial sock shape, for example. While the chambers 140, 150 may be formed by sewing, other means of forming the chambers are contemplated. The elongated body 120 further comprises an inside surface 124 adapted to contact the back 40 of an animal 10, and an outside surface 126 (see also FIG. 1) adapted to be visible while the covering 100 is attached to the animal 10. In a preferred embodiment, the elongated body 120 is open along at least a portion 125 of the elongated body 120 so that the inside surface 124 can lay flat across an animal's back 40 when the covering 100 is worn by an animal 10 as shown in FIGS. 1-3. This wearing configuration provides additional comfort to the animal and allows the covering 100, and in particular the inside surface 124 of the elongated body 120 to slide across the animal's back 40 as the animal 10 moves it legs while wearing the covering 100.

Figure 6:
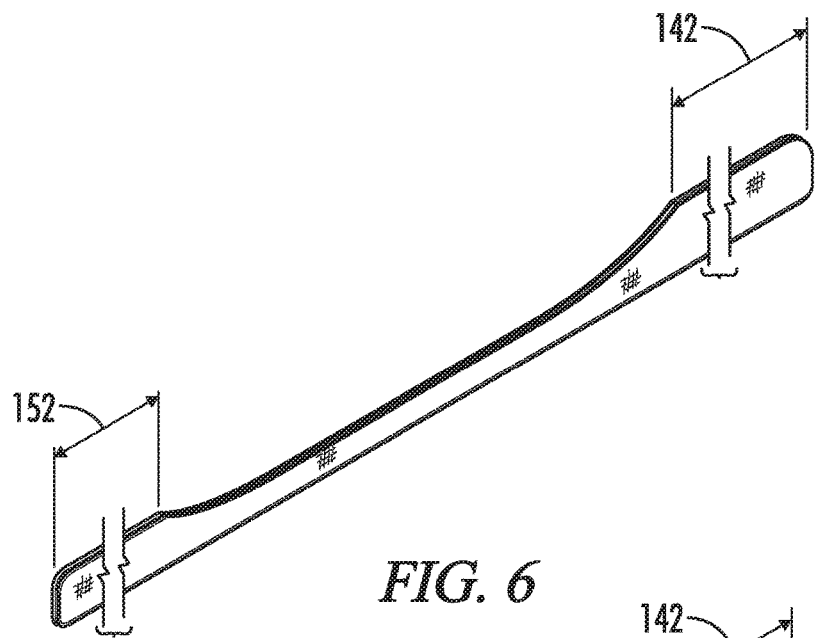
FIG. 6 is a perspective view of one embodiment of a stretchable animal foot covering showing a variable depth.
Figure 7:
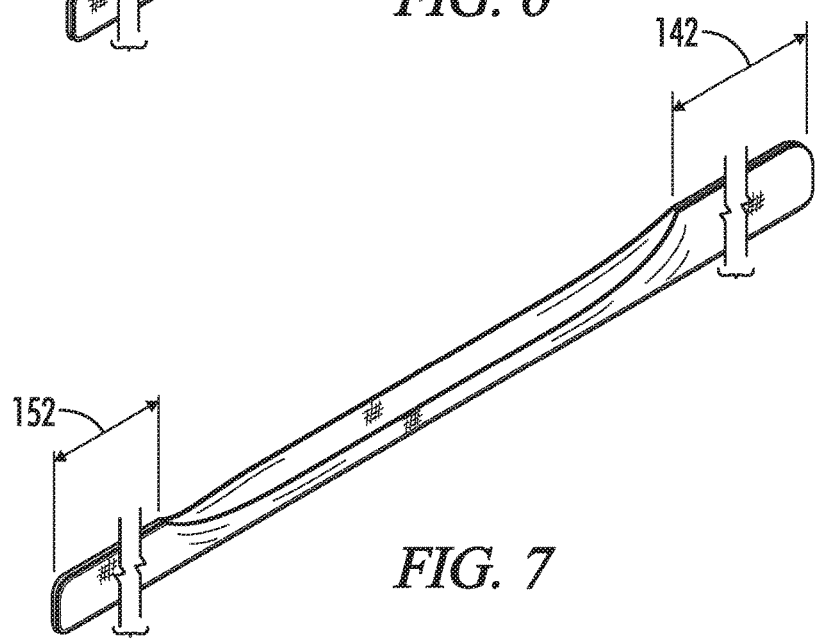
FIG. 7 is a perspective view thereof in a slightly opened condition.

Each foot-receiving chamber 140, 150 is further defined by a depth 142, 152 and a width 144, 154 that respectively correlates to a depth and a size of an animal's foot received within the foot-receiving chamber 140, 150. The depth 142, 152 and width 144, 154 further define the capacity and the amount of animal leg/foot surface area covered by the foot-receiving chambers 140, 150. For example, if it is desired to cover a substantial portion of the animal's legs in addition to the animal's feet, then the depth 142, 152 would be greater than if it was desired to only cover the animal's paws. At a minimum, the foot-receiving chambers 140, 150 should be sufficient to capture an animal's feet while allowing for normal movement of the animal without feeling constrained. Thus, as graphically illustrated in FIGS. 6 and 7, the depth 142, 152 may be adjustable to fit the particular animal, or environmental condition, wherein it will be contemplated that a pet owner may have a variety of different types and sizes of coverings to accommodate a variety of different environmental conditions. Further, each depth 142, 152 and each width 144, 154 may be the same or different dimension as desired.

One method of applying covers 100, 200 to an animal 10 as shown in FIG. 2 is as simple as inserting front foot 22 into foot-receiving chamber 140, then stretching cover 100 over the animal's back 40 and inserting rear foot 34 into foot-receiving chamber 150, then inserting front foot 24 into foot-receiving chamber 140 of cover 200, then stretching cover 200 over the animal's back 40 and over already-placed cover 100 and inserting rear foot 32 into foot-receiving chamber 150. Using the animal's back 40 for leverage as the cover is stretched from one end of the front of the animal to the back, or vice versa, or from side to side as shown in the embodiment of FIG. 3, makes it easier to attach the covers to the feet of the animal since the stretching of the covers over the back of the animal also tends to maintain the already-inserted foot within the foot-receiving chamber.

Figure 8:
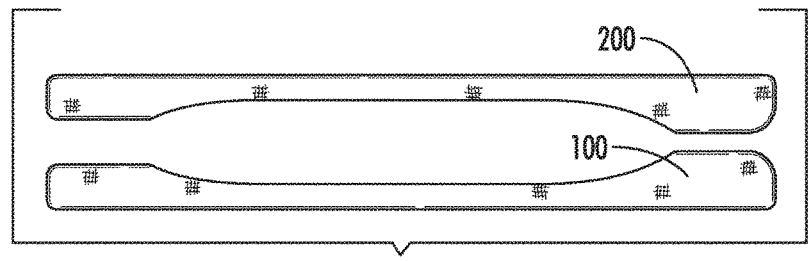
FIG. 8 is a front view of one embodiment of a pair of stretchable animal foot coverings.
Figure 9:
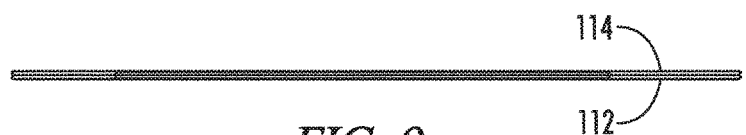
FIG. 9 is a top view of one embodiment of one stretchable animal foot covering.
Figure 10:
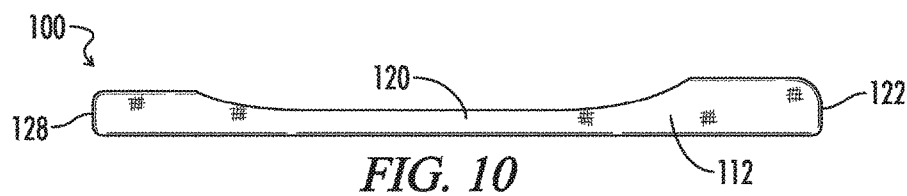
FIG. 10 is a front elevation view thereof.
Figure 11:
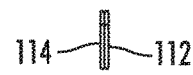
FIG. 11 is a left side elevation view thereof.
Figure 12:
FIG. 12 is a right side elevation view thereof.
Figure 13:
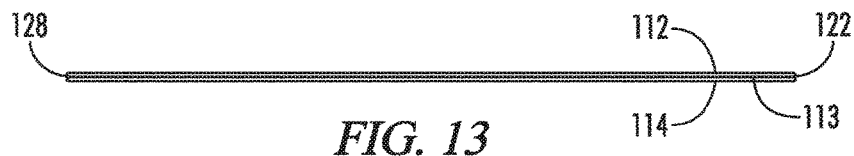
FIG. 13 is a bottom view thereof.

FIGS. 8-13 illustrate a variety of different views of the coverings 100, 200 of FIGS. 1-3, wherein FIG. 8 is a front view the pair of coverings 100, 200, FIG. 9 is a top view thereof, FIG. 10 is a front elevation view thereof, FIG. 11 is a left side elevation view thereof, FIG. 12 is a right side elevation view thereof, and FIG. 13 is a bottom view thereof. While one embodiment of a covering 100 is shown in FIGS. 8-13, having particular body and foot-receiving chamber configurations (shapes, sizes, etc.), it will be appreciated that other constructions, configurations, dimensions and shapes are possible.

Figure 14A:
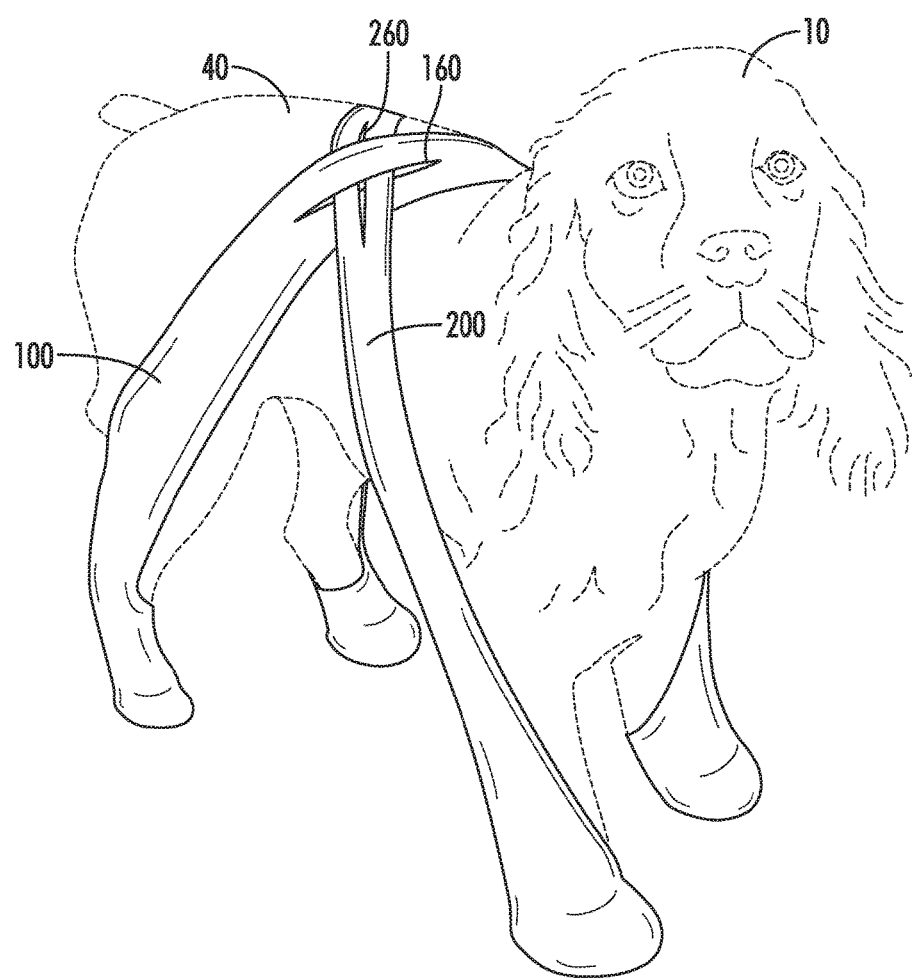
FIGS. 14A-14B illustrate one embodiment of a pair of stretchable animal foot coverings incorporating a connector formed in each covering.
Figure 14B:
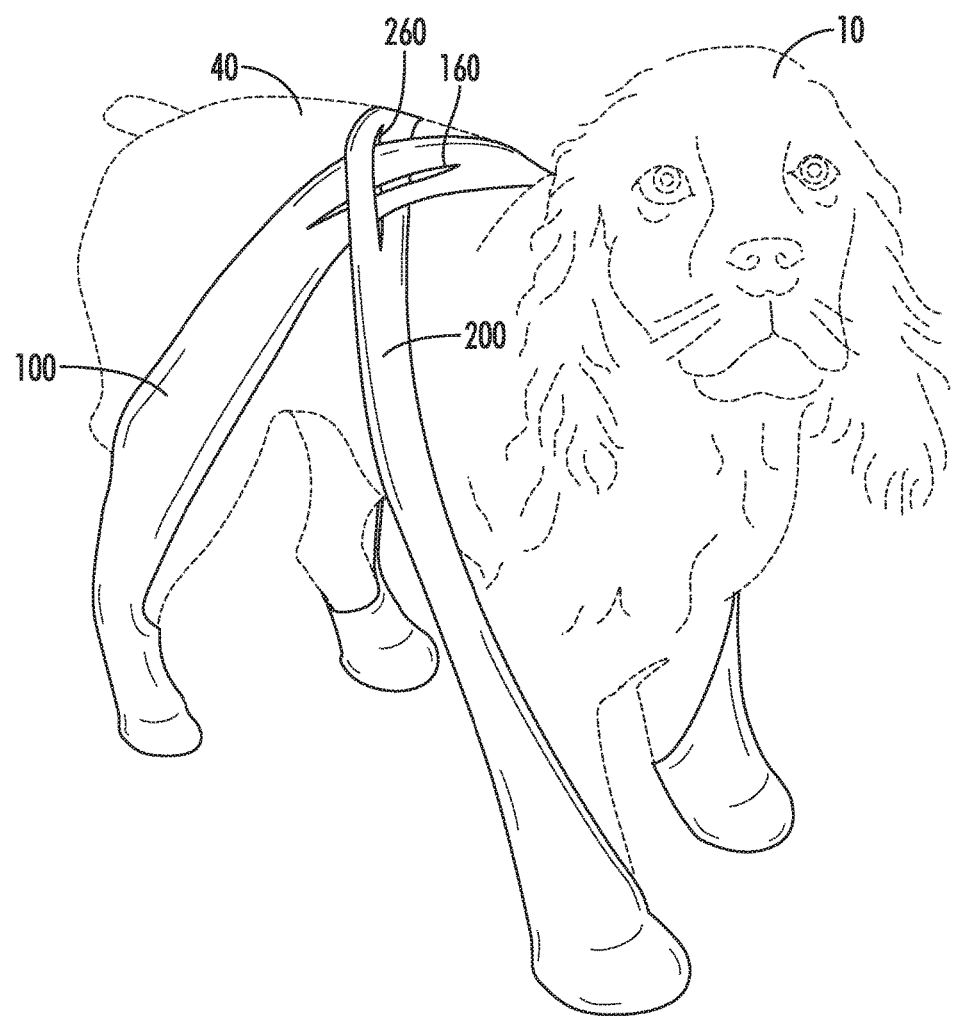
Figure 15:
FIGS. 15-16 illustrate one embodiment of a pair of stretchable animal foot coverings incorporating a fastener for attaching the coverings.
Figure 16:

In the event that a pair of coverings 100, 200 is worn by an animal 10 as shown, for example, in FIG. 2, then it may be desired to connect or otherwise associate the coverings 100, 200 in some manner so as to prevent the coverings 100, 200 from sliding apart along the animal's back 40. FIGS. 14A and 14B illustrate one embodiment of a connector in the form of an opening 160, 260 provided on each stretchable cover 100, 200 respectively to associate the stretchable covers 100, 200 when worn by an animal 10. In the embodiment of FIG. 14A, cover 200 passes through opening 160 in cover 100, while in the embodiment of FIG. 14B, cover 100 passes through opening 260 in cover 200. In each embodiment illustrated in FIG. 14A and FIG. 14B, the size of the opening 160, 260 determines the amount of relative movement of the coverings 100, 200. While an opening 160, 260 is illustrated in each covering 100, 200, it will be appreciated that an opening may only be incorporated into one covering. While the embodiment of FIGS. 14A-14B illustrate a slidable connector, the embodiment of FIGS. 15-16 illustrate fastening connectors in the form of a button closure 170 (FIG. 15) or a snap closure 180 (FIG. 16). Other types of fastening closures are contemplated.

Figure 17:
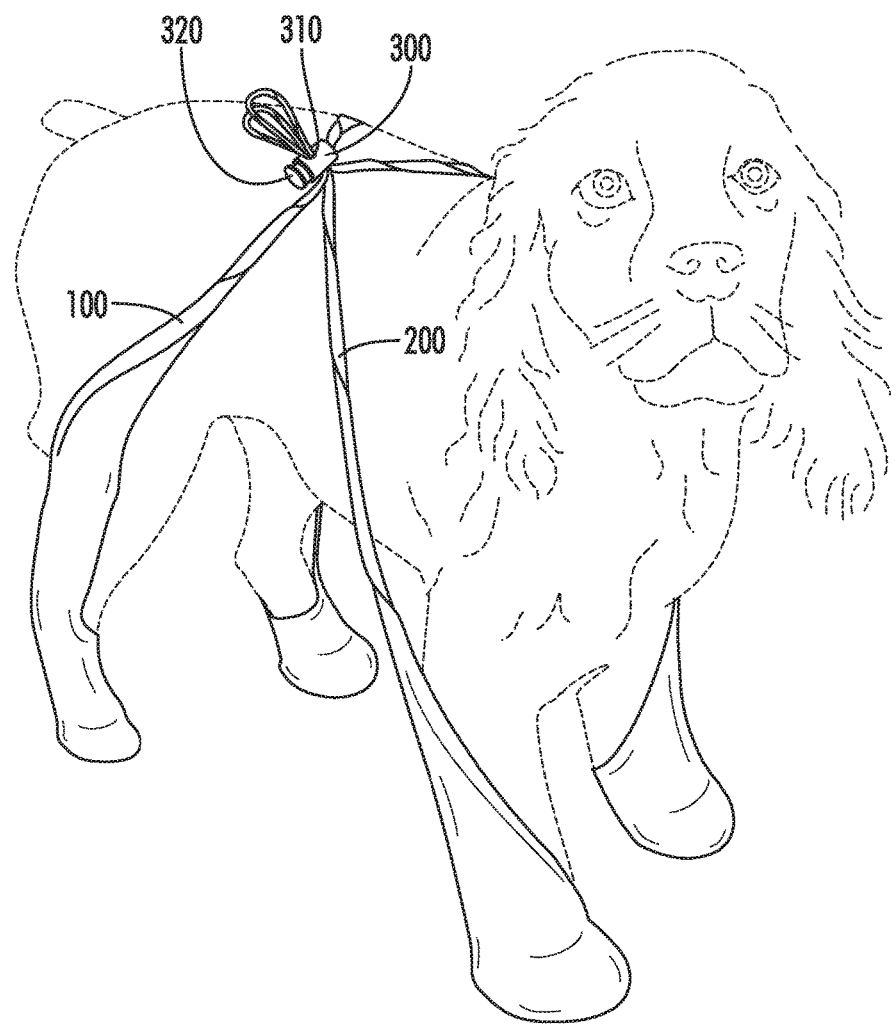
FIGS. 17-18 illustrate alternate embodiments of a pair of stretchable animal foot coverings incorporating an adjustable fastener for attaching the coverings.
Figure 18:
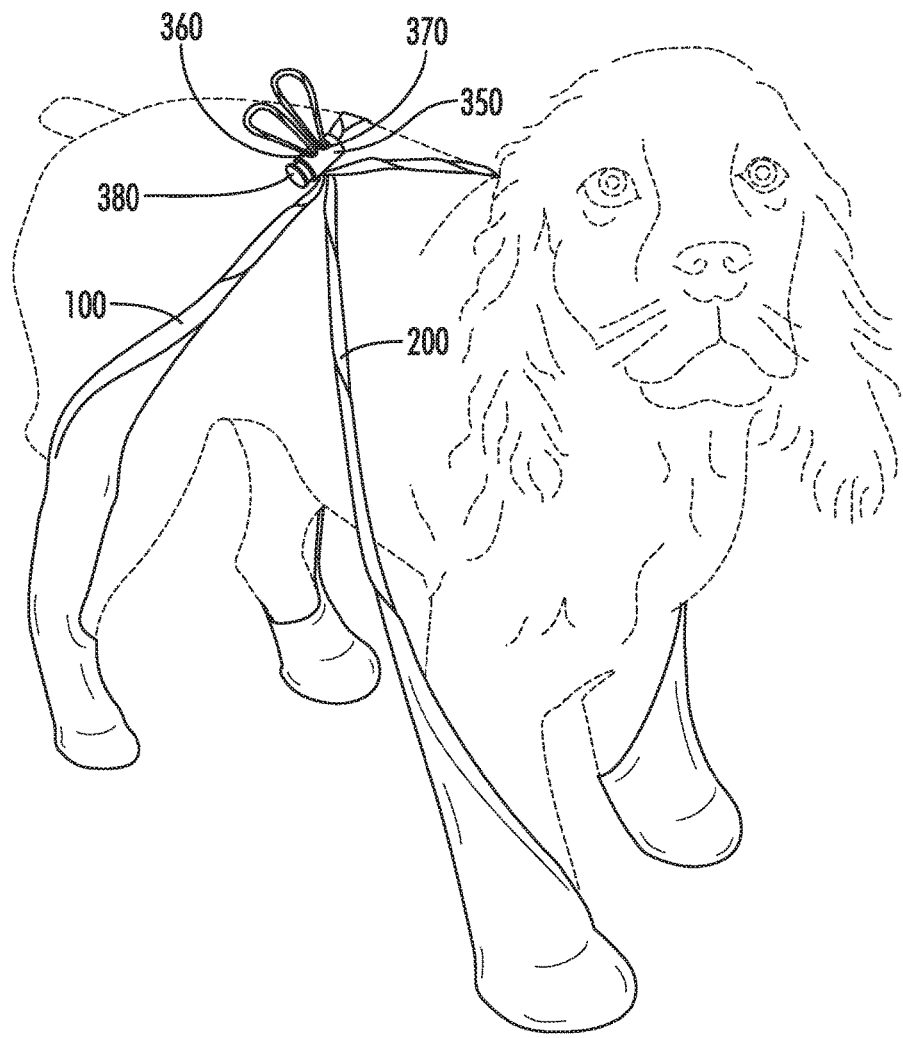
Figure 25:
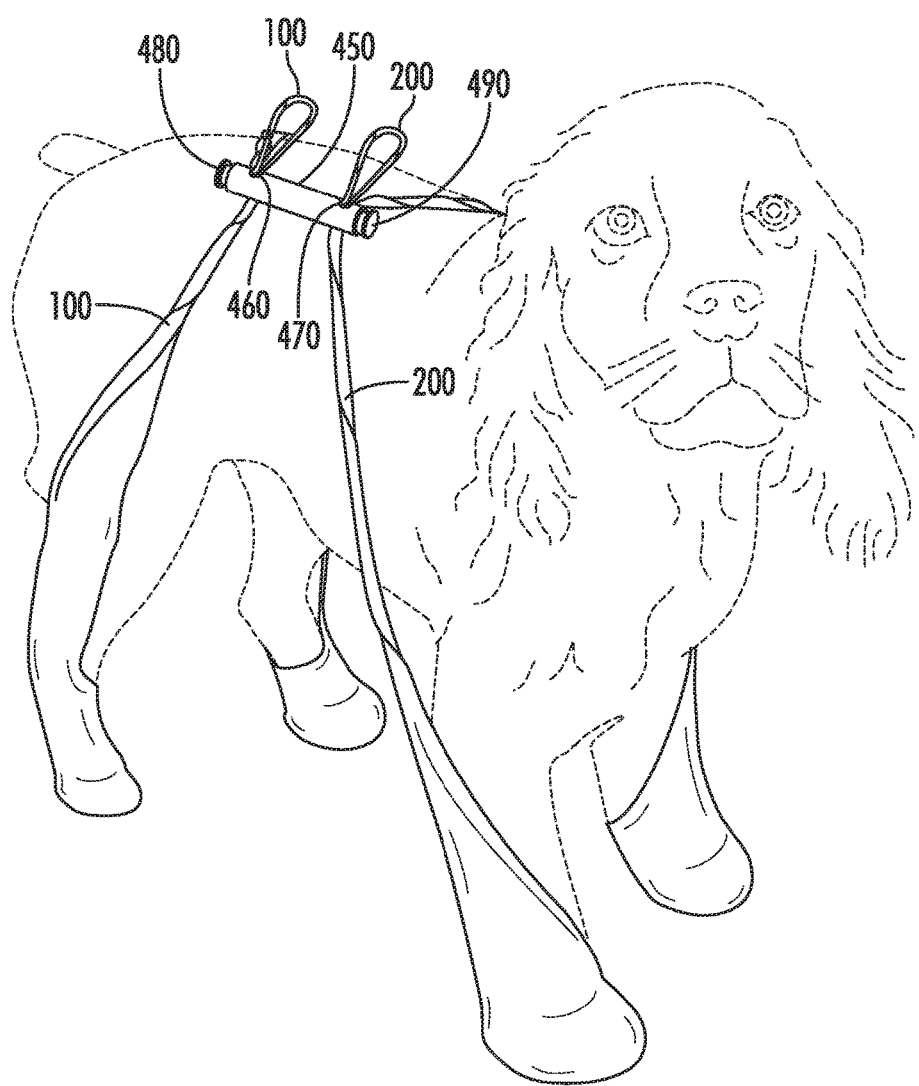
FIG. 25 illustrates one embodiment of a pair of stretchable animal foot coverings incorporating an adjustable fastener for attaching the coverings.

The embodiments of FIGS. 17-18 illustrate an adjusting connector 300, 350 in the nature of a cord stopper that is attachable to the animal foot coverings for receiving at least a portion of each cover 100, 200 for adjusting the tightness of the coverings when worn by an animal. In the embodiment of a FIG. 17, adjusting connector 300 further comprises an opening 310 for receiving a looped portion of each covering 100, 200, wherein the adjusting connector 300 further comprises a biased closure 320 for capturing and retaining the looped portions of the covers 100, 200 within the one opening 310. If the adjusting connector 300 is in the nature of a cord stopper, then pressing upon the closure 320 (button) would allow the covers 100, 200 to move freely within the opening 310, and releasing the closure 320 would capture the covers 100, 200 within the opening 310. The looped portions of the covers 100, 200 extending through the opening 310 may then be drawn or released through the opening 310 to tighten or loosen the covers 100, 200 relative to the animal, and then the looped portions may be tied into a bow if desired. In an alternative embodiment, portions of the covers may be attached to an animal collar and/or leash to further support and retain the covers relative to the animal. In the embodiment of a FIG. 18, adjusting connector 350 further comprises a separate opening 360, 370 for receiving a looped portion of each covering 100, 200 to allow for the independent adjustment of each covering 100, 200, wherein the adjusting connector 350 further comprises a biased closure 380 for capturing and retaining the looped portions of the covers 100, 200 within the openings 360, 370. The embodiment of FIG. 18 may be sold as a kit 400 as shown in FIG. 19, including a pair of coverings 100, 200 and an adjustable connector 350. While the covers 100, 200 in the embodiments of FIGS. 17-18 are show such that they are not lying flat against the animal's back, it will be appreciated that an adjustable connector could be provided with openings, such as slit openings (not shown) that would allow the remaining portions of the covers 100, 200 to lie flat against the animal. Other types of connectors and connection schemes are contemplated. For example, in the embodiment of FIG. 25, there is provided an elongated connector 450 further comprises a separate opening 460, 470 for receiving a looped portion of each covering 100, 200 to allow for the independent adjustment of each covering 100, 200, wherein the elongated connector 400 further comprises a biased closure 480, 490 associated with each opening 460, 470 respectively for capturing and retaining the looped portions of the covers 100, 200 within the openings 460, 470.

FIGS. 20-22 illustrate a variety of different embodiments of foot-receiving chambers having, in the embodiment of FIG. 20, a gripping on the outside of the chamber 140 (and also chamber 150), which may be in the form of a layer 142 of protective or gripping material, or a shaped tread 144 such as a paw print as shown in FIG. 21. In an alternative embodiment, the inside of the chamber 140 may be lined with a separate material 146 that is waterproof or that otherwise protects the animal's foot from the elements that may be transmitted through the outer surface of the chamber 140. In one example, the inside of the chamber may be fleece lined or fur lined for warmth and the outside may have a fabric that is waterproof. In the various embodiments, the outer and/or inner layer of material is intended to be protective to increase the durability of the foot-receiving chamber, and/or to allow the covering to be used in a variety of different environments.

Figure 23:
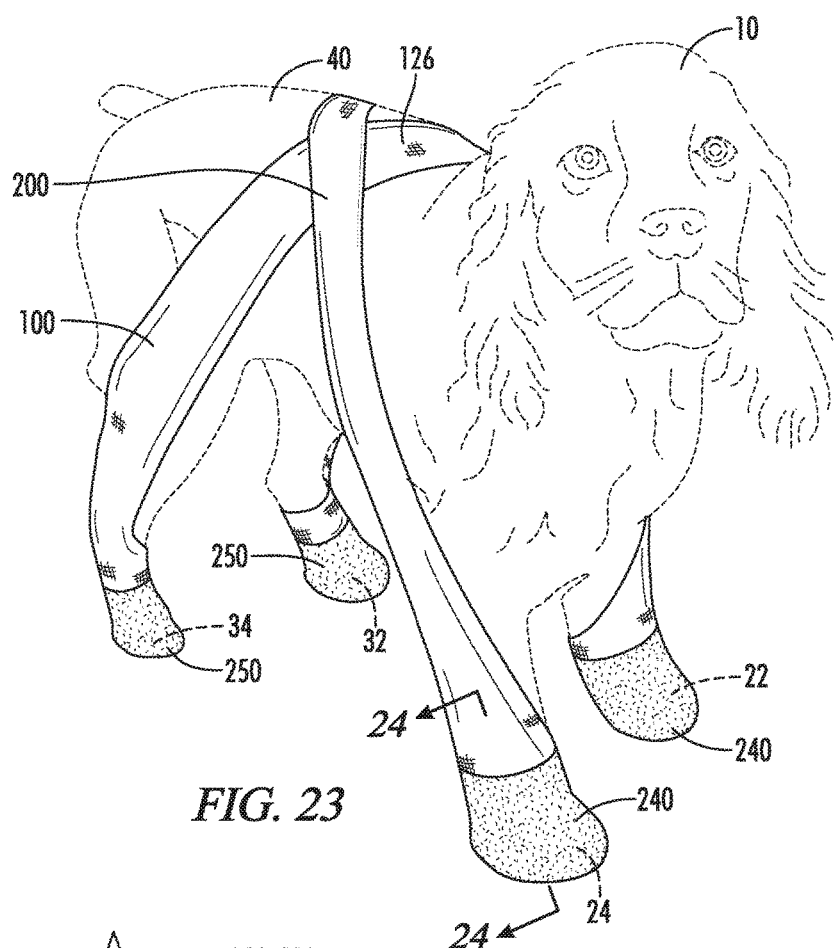
FIG. 23 illustrates one embodiment of a plurality of stretchable animal foot coverings shown being worn by an animal.
Figure 24:
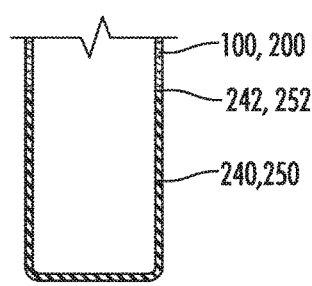
FIG. 24 illustrates a cross-section taken along line 24-24 in FIG. 23.

In the embodiment of FIGS. 23 and 24, coverings 100, 200 formed from a stretchable material terminate before the animal feet 22, 24, 32, 34 and transition at a seam 242, 252 into foot-receiving chambers 240, 250 formed from a different material that is preferably waterproof or that otherwise protects the animal's foot from the elements that may be transmitted through the outer surface of the chambers 240, 250. The chambers 240, 250 are preferably sized, shaped and flexibly configured to fit the animal's feet securely and comfortably without sacrificing mobility or creating an awkward contained environment for the animal's feet. In one embodiment, the chambers 240, 250 are attached to the coverings 100, 200 by sewing. Other methods of attachment are contemplated. Further, the attachment can be in the nature of a permanent attachment, such as by sewing or welding, or a removable attachment such as through removable fasters like buttons, hook and loop fasteners, snaps, zippers and the like. In addition, the seam 242, 252 may be configured with gripping means such as an elastic feature, a reduced or tighter cross-section or the like, to assist with retaining the chambers 240, 250 on the animal's feet.

In one embodiment, the entirety of the chambers 240, 250 are formed from waterproof material such as rubber, plastic or elastomer. In an alternative embodiment (not shown), the chambers 240, 250 may be formed from more than one types of material, or may be lined with a different material for comfort. The chambers 240, 250 are preferably sized and configured to cover the animal's feet and extend upward along the animal's legs a distance sufficient to protect the animal's feet from large puddles and the like. The size, shape, material and overall configuration of the chambers 240, 250 may vary depending on the type of animal, environmental conditions and the like. For example, the chambers 240, 250 may be configured for more durable conditions in more durable terrain, rather than conditions more akin to urban environments. In one example, the inside of the chamber may be fleece lined or fur lined for warmth while the outside may have a material that is waterproof. In the various embodiments, the outer and/or inner layer of material (can be the same layer) is intended to be protective to increase the durability of the foot-receiving chamber, and/or to allow the covering to be used in a variety of different environments.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A stretchable animal foot covering comprising:
   a first elongated body with foot-receiving chambers on opposite ends of the first elongated body;
   a second elongated body with foot-receiving chambers on opposite ends of the second elongated body; and
   an adjusting connector for associating the elongated bodies when worn by an animal,
   wherein each elongated body is formed from a first stretchable material that terminates in at least partially closed ends formed from a second material that form the foot-receiving chambers, the first and second elongated bodies each being open along at least a portion of the elongated body so that the elongated body portion can lay across an animal's back when the foot covering is worn by an animal,
   wherein the first and second elongated bodies are drawn towards each other by the adjusting connector such that a portion of the first elongated body and a portion of the second elongated body are adjacent each other, and
   wherein the adjusting connector is configured to adjust a size of the stretchable animal foot covering when the foot covering is worn by an animal,
   wherein the adjusting connector further comprises at least one opening, and an entire width of each of the first elongated body and the second elongated body are received through the at least one opening.

2. The stretchable animal foot covering of claim 1, further comprising a fastening connector for attaching the elongated bodies.

3. The stretchable animal foot covering of claim 1, wherein the adjusting connector further comprises a biased closure for capturing the portion of the elongated body within the at least one opening.

4. The stretchable animal foot covering of claim 1, wherein the adjusting connector further comprises a plurality of openings for receiving at least a portion of each elongated body within a separate opening.

5. The stretchable animal foot covering of claim 4, wherein the adjusting connector further comprises a biased closure for capturing each portion of the elongated body within each opening.

6. The stretchable animal foot covering of claim 1, further comprising gripping on the outside of each foot-receiving chamber.

7. The stretchable animal foot covering of claim 6, wherein the gripping further comprises material that differs from the material of the foot-receiving chamber.

8. The stretchable animal foot covering of claim 7, wherein the gripping further comprises a shaped tread.

9. The stretchable animal foot covering of claim 1, each foot-receiving chamber further comprising a depth and a width that respectively correlates to a depth and a size of an animal's foot received within the foot-receiving chamber.

10. The stretchable animal foot covering of claim 1, wherein the first and second materials are different.

11. The stretchable animal foot covering of claim 10, wherein the second material is waterproof.

12. The stretchable animal foot covering of claim 1, wherein the respective portions of the first and second elongated bodies are drawn through at least one bore in the connector.

13. The stretchable animal foot covering of claim 1, wherein the connector adjusts the size of the stretchable animal foot covering by gripping each of the first elongated body and the second elongated body at one of a plurality of locations.

14. The stretchable animal foot covering of claim 1, wherein the size of the stretchable animal foot covering is adjusted by varying a length between the connector and an end of the first or second elongated body.

* * * * *